Dec. 12, 1967  J. P. FANARITIS  3,357,407
THERMAL RECOVERY APPARATUS AND METHOD
Filed Jan. 14, 1965  6 Sheets-Sheet 1

FIG. 1

INVENTOR
JOHN P. FANARITIS
BY *Sidney G. Klein*
AGENT

Dec. 12, 1967  J. P. FANARITIS  3,357,407
THERMAL RECOVERY APPARATUS AND METHOD
Filed Jan. 14, 1965  6 Sheets-Sheet 2

INVENTER
JOHN P. FANARITIS
BY Sidney G. Klein

AGENT

Dec. 12, 1967  J. P. FANARITIS  3,357,407
THERMAL RECOVERY APPARATUS AND METHOD
Filed Jan. 14, 1965  6 Sheets-Sheet 3

INVENTOR
JOHN P. FANARITIS
BY Sidney G. Klein
AGENT

United States Patent Office

3,357,407
Patented Dec. 12, 1967

3,357,407
THERMAL RECOVERY APPARATUS
AND METHOD
John P. Fanaritis, Warren, Pa., assignor, by mesne assignments, to Struthers Thermo-Flood Corporation, Tulsa, Okla., a corporation of Delaware
Filed Jan. 14, 1965, Ser. No. 425,432
1 Claim. (Cl. 122—1)

The present invention relates to the recovery of oil from wells, and more particularly to thermal recovery apparatus, and a method associated therewith, for the secondary recovery of crude oil.

Techniques for secondary oil recovery have been well known in the prior art. The most commonly employed techniques provide for the flooding with a suitable fluid, of an oil well which has previously been depleted by the usual primary oil recovery method of pumping. The flooding of the oil well is accomplished by injecting the fluid under pressure into the oil-bearing formation. The injected fluid moves into the areas left empty by the oil, gas and water which have been previously removed from the well, and forces any residual oil in the well to move in the direction of the well outlet. Such residual oil may thus be recovered, and the productivity of the well substantially increased.

The fluids which have conventionally been employed for flooding oil wells for secondary recovery purposes are cold water, hot water and steam. The steam flooding techniques have offered a number of advantages, as compared to the water flooding techniques. Such steam flooding techniques have usually involved the use of conventional steam generation equipment. As the principal advantage of the use of steam, a maximum amount of heat may be injected into the ground, while utilizing a minimum mass of material. As a result, a substantial saving is realized in respect of the cost of the feed water employed. Also, the amount of water which must be separated from the oil recovered, is minimized.

The steam flooding techniques are particularly applicable in the case of the recovery of highly viscous crudes. Thus, the comparatively high temperatures provided by the steam produce an increase in the temperature of the crude oil, and a resultant reduction in the oil viscosity. As a consequence, the oil is caused to flow more readily from the well. As an additional advantage of the use of steam flooding, the higher temperatures of the steam cause vaporization of light fractions of the crude oil. The vapors thus produced provide an additional driving force, to aid the flow of the oil.

The known steam flooding techniques have, however, suffered from a number of disadvantages. These disadvantages have, primarily, resulted from the use of conventional steam generators in carrying out such techniques. One of the disadvantages of the use of conventional steam generators is that the latter usually require that the feed water employed therein be subjected to highly costly preliminary processing. Such preliminary processing has been found to be necessary in order to minimize problems with respect to the deposition of solids, corrosion, scaling, etc., in the operation of the steam generator. The necessity of the extensive preliminary processing of the feed water has resulted, in part, from the fact that the steam generators have been designed to produce steam of very high (e.g., about 98 percent) quality. In producing such high quality steam, the total dissolved solids content of the feedwater must be extremely low, in order to eliminate the problem of deposition of the solids on the steam generator tubes.

As another disadvantage of the use of conventional generators for thermal recovery purposes, such generators are usually of quite complex construction and are relatively expensive to operate. Also, these generators usually require the constant attendance of an operator.

As a further disadvantage of the use of conventional steam generators for the purpose under discussion, such generators have often not been available in sizes which will enable the production of steam pressures sufficiently high for particular desired applications. Thus, for example, the relatively low pressures and resultant low steam temperatures produced by the conventional steam generators, do not provide sufficient heat to appreciably lower the viscosity of low-gravity crude oils. As a consequence, the degree of secondary oil recovery may not be sufficiently great to render economical the use of steam flooding. One of the biggest limitations with respect to the design of steam generators for the production of steam of the desired high pressures, has been the factor of the initial cost of such generators. With great increases in the steam pressures which the generators are designed to produce, the initial cost rises markedly, particularly in respect of the manufacture of the drums which have usually been present in the generators.

Conventional steam generators have presented a still further disadvantage, when employed for thermal recovery purposes, in respect of the comparatively limited volume of outlet steam which is made available. Also, the known types of steam flooding equipment have ordinarily been ineffective for the handling of oil shale deposits.

The conventional steam generators available for thermal recovery purposes have also presented a number of maintenance problems. One of these problems has resulted from the fact that in the known types of steam generators, preheaters for the feed water have been incorporated within the radiant sections of the generators, in which the steam is produced. As a result, moisture from the products of combustion tends to condense on the preheater tube surfaces, and serious corrosion problems may then be created.

Another serious problem in the maintenance of a conventional steam generator occurs particularly when one of the cheaper types of fuel (e.g., crude oil or pitch) is employed therein. The use of one of these cheaper fuels commonly results in the formation of heavy soot deposits, which most often occur on the surfaces of the tubes of the economizer which is usually incorporated in the steam generator.

As yet another disadvantage of the use of conventional steam generators for thermal recovery purposes, the life expectancy of the radiant sections thereof has been greatly limited due to the extreme heat conditions encountered therewithin. At the same time, problems have been presented with respect to the maintenance and particularly the replacement, of the tubes within which the steam is generated.

It is therefore an object of the present invention to provide improved thermal recovery apparatus for the secondary recovery of oil.

Another object of the invention is to provide thermal recovery apparatus requiring a reduced amount of pretreatment of the feed water utilized, as compared to known thermal recovery apparatus.

Another object of the invention is to provide thermal recovery apparatus incorporating improved feed water deaeration means.

Still another object of the present invention is to provide an improved heater for the generation of steam for thermal recovery purposes.

A further object of the invention is to provide a thermal recovery heater which is of relatively simple and inexpensive construction.

A further object of the present invention is to provide a thermal recovery heater which is relatively simple and inexpensive to operate, requiring a minimum of maintenance and operator attendance, and offering a maximum life expectancy of use.

A further object of the invention is to provide a thermal recovery heater which will efficiently produce steam in greater quantities and at higher pressures and temperatures than has been possible in the case of steam generators heretofore known.

A still further object of the invention is to provide a thermal recovery heater in which may be employed comparatively cheap types of fuel, with minimum danger of sooting.

An additional object of the present invention is to provide an improved process for the production of steam for thermal recovery purposes.

These and other objects of the invention will become more apparent from the following specification, when read in conjunction with the accompanying drawings, in which.

Figure 1:
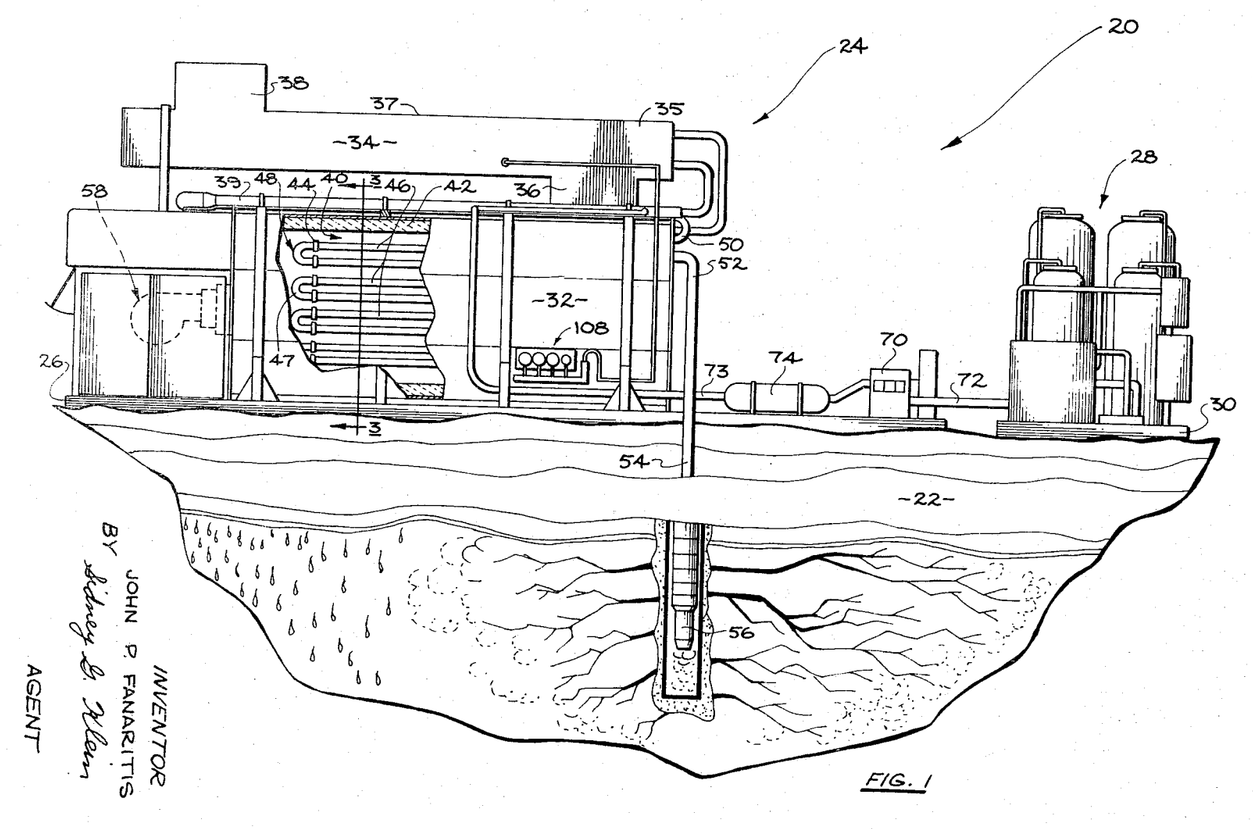
FIG. 1 is a side elevation, being partly in section, of thermal recovery apparatus in accordance with the invention, said apparatus being shown in position for the injection of steam into an oil-bearing formation.

Referring to the drawings, and particularly to FIG. 1, thermal recovery apparatus 20 is shown, being in position for the injection of steam into an oil-bearing formation 22 of a depleted oil well, and for the purpose of secondary oil recovery from the latter. The apparatus 20 includes a thermal recovery heater 24, which heater is mounted on a suitable skid 26. Associated with the heater 24 is a chemical deaerator 28, also mounted on a suitable skid 30.

The heater 24 is essentially a water vaporizer of the forced circulation type, and includes a radiant section 32 and a convection section, or economizer 34. The economizer 34 is provided in a duct 35, for conducting exhaust gases from the radiant section 32. The duct 35 is mounted above the radiant section 32, and is constructed of a generally vertical duct inlet portion 36; a generally horizontal main duct portion 37; and a generally vertical duct outlet 38. A heat exchanger 39 is provided, for preheating water to be conducted through the economizer 34.

Figure 2:
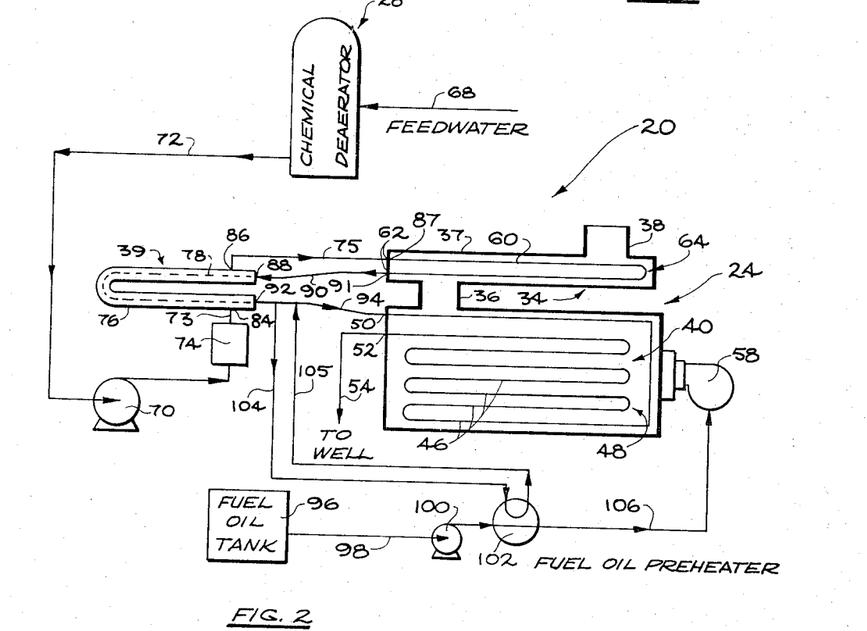
FIG. 2 is a diagrammatic view of the apparatus of FIG. 1, and illustrates the flow of materials in said apparatus.
Figure 3:
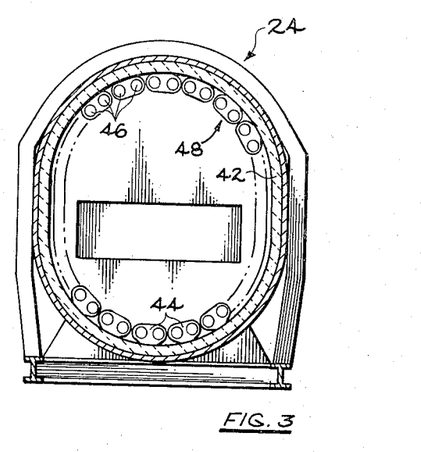
FIG. 3 is an enlarged vertical section taken along the lines 3—3 of FIG. 1.

The radiant section 32 of the heater 24 is of generally hollow-cylindrical shape, being supported in horizontal position on the skid 26. Said radiant section 32 is constructed of a material, such as, e.g., carbon steel, and provides therewithin a heating chamber 40. The wall surface of the chamber 40 is lined with a suitable conventional refractory material, such as seen at 42. Supported within the chamber 40 by means of suitable tube supports 44 is a series of tubes 46 (see also FIG. 2), extending generally horizontally, and being connected together at their respective ends by return bends 47, and in such manner as to form a coil 48 passing once through said chamber 40. As seen in FIG. 3, the coil 48 is of a generally hollow-cylindrical configuration. Said coil 48 is so proportioned, that the tubes 46 lie closely adjacent the refractory lining 42.

The coil 48, at the inlet end 50 thereof, is adapted to receive feed water for the conversion of the latter into steam, as will be described hereinbelow. The outlet end 52 of the coil 48 is connected to piping 54, the latter being adapted to conduct steam produced in the coil 48 into the oil-bearing formation 22. The outer end of the piping 54 is provided with a suitable nozzle 56, for injection of the steam directly into the oil bearing formation 22.

Within the chamber 40, and adjacent one end thereof, is mounted a burner 58 of conventional structure. The burner 58 is adapted to burn fuel oil for the production of radiant heat within the chamber 40.

Mounted within the horizontal duct portion 37 is a series of horizontal tubes 60, being connected together at their respective ends 62 to form a coil 64. The economizer 34 is provided by the coil 64, thus mounted within the duct portion 37. As will be described more fully hereinbelow, each of the tubes 60 is provided with four longitudinally extending fins 66.

The deaerator 28 is of conventional structure, and is designed to remove, by chemical action, oxygen which may be present in the feed water to be introduced into the heater 24, said feed water being conducted into said deaerator 28 through inlet piping 68. A pump 70, also of conventional design, serves to draw the deaerated water through outlet piping 72 from the deaerator 28. The water is then pumped by the pump 70 through piping 73 into the heat exchanger 39. The piping 73 conducts the feed water, prior to the entrance of the latter into the heat exchanger 39, through a conventional pulsator 74. The latter is adapted to compensate for changes in pressure in the line 73, which are inherent due to the nature of the action of the pump 70. Piping 75 serves to conduct the feed water, after passage through the heat exchanger 39, into the economizer 34.

Figure 4:
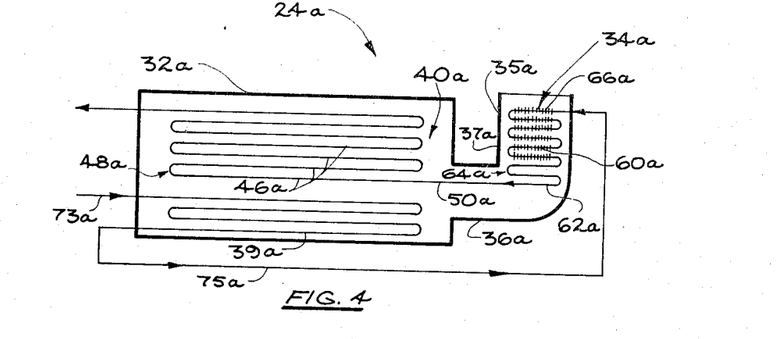
FIG. 4 is a diagrammatic view of a thermal recovery heater of the prior art.

Referring to FIG. 4, there is shown a heater 24a of the prior art, said heater 24a including a radiant section 32a, the latter defining a chamber 40a and having a pipe coil 48a mounted therein; and an economizer 34a. A duct 35a is provided for conducting exhaust gases from the chamber 40a, and is formed of an inner horizontal portion 36a, and an outer vertical portion 37a. A series of horizontal tubes 60a, being connected together at their respective ends 62a to form a coil 64a, is mounted within the duct portion 37a, so as to form together with the latter the economizer 34a. Each of the tubes 60a is provided with a series of circumferentially welded fins 66a, each of which fins 66a extends substantially radially with respect to the axis of the respective tube 60a.

Located within the chamber 40a is a pipe coil 39a for the purpose of preheating feed water to be introduced into the tubes 60a of the economizer 34a. Thus, feed water initially is pumped into the coil 39a through an inlet pipe 73a, and is heated during passage through said coil 39a by the radiant heat within the chamber 40a. The heated feed water, upon leaving the coil 39a, is conducted by a pipe 75a into the tubes 60a of the coil 64a of the economizer 34a, located within the vertical duct portion 37a. The feed water is thus heated by the hot effluent gases passing through the said duct portion 37a. The heated feed water is then conducted to the inlet 50a of the coil 48a within the chamber 40a, for conversion into steam.

In the case of the heater 24 of the present invention, the coil 39a of the prior art, such as is shown in FIG. 4, has been eliminated, and feed water to be introduced into the coil 64 of the economizer 34 is preheated by means of the heat exchanger 39, which is located externally of the radiant section 32. As seen more particularly in FIGS. 5–6, the heat exchanger 39 is in the form of a double pipe heat exchanger, constructed of a generally U-shaped outer pipe 76; and an inner pipe 78 which is generally coaxial with the pipe 76. An annular space 80 is thus provided between said outer pipe 76 and inner pipe 78. Suitable bands 82 serve to reinforce the pipe structure 76, 78.

Figure 5:
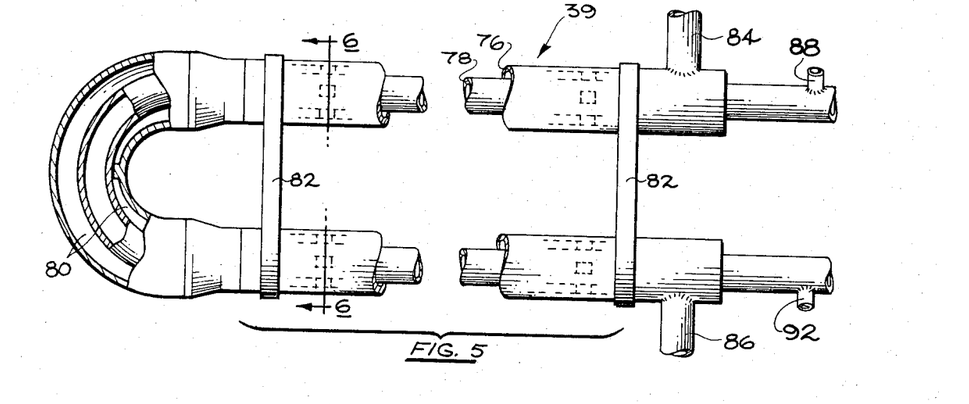
FIG. 5 is an enlarged top plan, being partly in section and partly broken away, of a heat exchanger of the apparatus of FIGS. 1 and 2.
Figure 6:
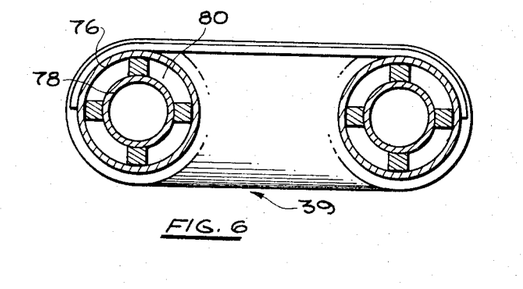
FIG. 6 is a vertical section taken along the lines 6—6 of FIG. 5.

An inlet 84 is provided for the outer pipe 76, said inlet 84 being adapted to receive feed water from the piping 73, which feed water has been pumped by the pump 70 from the deaerator 28. An outlet 86 for the pipe 76 is connected to the piping 75, which is adapted to conduct preheated water from the heat exchanger 39 to the inlet 87 of the coil 64 of the economizer 34. An inlet 88 is provided for the inner pipe 78 of the heat exchanger 38, and is adapted to receive hot water from piping 90, the latter being adapted to conduct said hot water from the outlet 91 of the coil 64 of the economizer 34. An outlet 92 for the inner pipe 78 is adapted to direct hot water into pipe 94, for the conduction of said hot water to the inlet 50 of the coil 48 of the radiant section 32.

Figure 7:
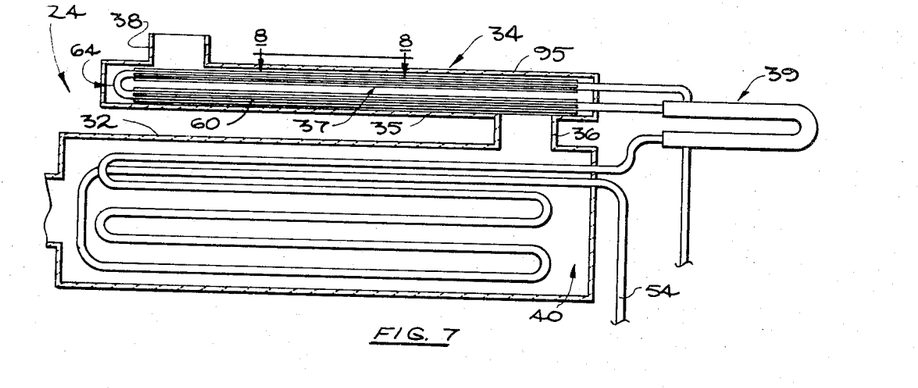
FIG. 7 is an enlarged diagrammatic view of the thermal recovery heater of FIGS. 1-3.
Figure 8:
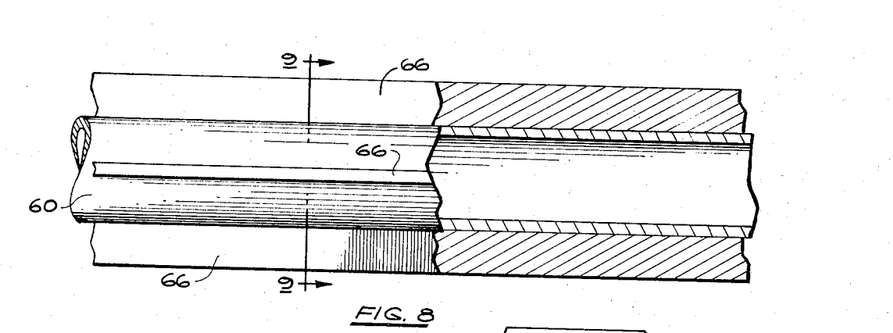
FIG. 8 is an enlarged fragmentary top plan, being partly in section, of an economizer tube of the heater of FIG. 7, as viewed along the lines 8—8 of FIG. 7.
Figure 9:
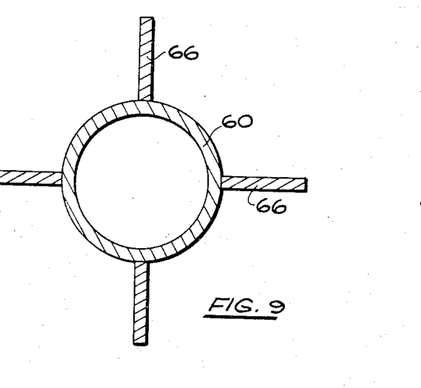
FIG. 9 is a further enlarged vertical section, taken along the lines 9—9 of FIG. 8.

In further contrast with the structure of the heater 24a of the prior art, and as most clearly seen in FIG. 7, the convection section, or economizer, 34 of the heater 24 is of relatively great length, as compared to the economizer 34a. Instead of being mounted at one side of the radiant section 32, the economizer 34, as previously noted, is mounted above the radiant section 32. The tubes 60 of the coil 64 of the economizer 34 are installed horizontally within the duct portion 37. The duct 35 is lined with refractory material as seen at 95, and is adapted to conduct effluent hot gases from chamber 40. Said gases enter the horizontal duct portion 37 through the relatively short, vertically extending duct inlet 36, and leave said duct portion 37 through the relatively short, vertically extending duct outlet 38.

Depending on the size of the heater 24, the economizer 34 is provided with multiple tubes 60 which may be as few as about twenty, for a heater 24 of smaller size; or as many as about fifty for a heater 24 of larger size. In contrast with the structure of the fins 66a of the heater 24a, the fins 66, which are welded to the outer surface of each of the tubes 60, extend longitudinally, and for substantially the full length of the respective tube 60.

The burner 58, as has been previously pointed out, is adapted to burn fuel oil. Said fuel oil is stored in a tank 96, from which it may be pumped through piping 98 by means of a pump 100 of conventional structure, through a fuel oil preheater 102. The fuel oil preheater 102 is in the form of a heat exchanger of conventional design, in which the fuel oil from tank 96 may be brought into contact with hot water. Said hot water is conducted to the preheater 102 by piping 104, which is connected to the outlet pipe 94 leading from the inner heat exchanger pipe 78. The hot water is returned by piping 105 to said pipe 94, for subsequent feeding into the tube coil 48. The fuel oil, after thus being heated in the preheater 102, is conducted to the burner 58 by piping 106.

It may be desired in some cases to include in the thermal recovery apparatus 20 additional water treating equipment (not shown) for the purpose of reducing the dissolved solids content of the feed water, reducing the hardness thereof, or otherwise making said feed water more suitable for use in the heater 24.

In order to control the operation of the thermal recovery apparatus 20, said apparatus 20 is provided with a system of controls such as are seen in part at 108 (FIG. 1). Since the controls are of conventional type, and are operated in conventional manner, said controls will not be described in particular.

The heater 24 is designed to produce steam of 75–90 percent quality, depending on the concentration of solids in the feed water.

In the operation of the apparatus 20, the feed water is initially drawn by the pump 70 through the inlet pipe 68 and into the deaerator 28. After deaeration, the feed water leaves the deaerator 28, and is pumped by the pump 70 through the piping 72 and 73 and the pulsator 74, and into the inlet 84 of the outer pipe 76 of the heat exchanger 39. The feed water passes through the annular space 80 of said heat exchanger 39, and is heated by hot feed water received from the economizer 34 through the piping 90 and inlet 88, said hot feed water passing through the inner pipe 78 of the heat exchanger 39. The preheated feed water leaves the heat exchanger 39 through the outlet 86, and is conducted by the piping 75 into the inlet 87 of the tube coil 64 of the economizer 34. In the economizer 34, the preheated feed water passes through the tubes 60 of the coil 64, and to the outlet 91 of the latter. The feed water in the tubes 60 is heated by flue gases from the chamber 40.

The flue gases from the chamber 40 enter the duct 35 through the vertical duct portion 36; flow through the horizontal duct portion 37; and are exhausted to the atmosphere through the outlet 38. The flue gases, as they move through the duct portion 37, tend to carry any entrapped soot particles through to the outlet 38, instead of depositing said soot particles on the surfaces of the fins 66. If any soot is deposited, the movement of the flue gases along the fin surfaces may serve to purge the latter of such soot deposited thereon.

The hot feed water which is passed through the inner pipe 78 of the heat exchanger 39, leaves the latter through the outlet 92, and is conducted by the piping 94 into the inlet 50 of the tube coil 48 within the chamber 40 of the radiant section 32.

A portion of the hot water which has left the heat exchanger 39 through the outlet 92 and piping 94, is conducted by means of piping 104 to the fuel oil preheater 102. Said portion of hot water serves the purpose of heating fuel oil which has been pumped by the pump 100 from the fuel oil tank 96 through the piping 98, and into said preheater 102. The feed water is returned from the preheater 102 to the piping 94 by means of the piping 105; while the preheated oil is conducted to the burner 58 by piping 106.

The water which has entered the tube coil 48 of the radiant section 32, passes once through said tube coil 48, and is converted into steam by means of radiant heat produced by burning of the fuel oil in the burner 58. The effluent steam, consisting of a steam-water mixture (i.e., 75–90 percent quality steam), leaves the coil 48 through the outlet end 52 thereof, and is conducted by the piping 54 and nozzle 56 into the oil-bearing formation 22, for direct injection into the latter.

*Example 1*

As an example of the operation of the thermal recovery apparatus 20 of FIGS. 1–3 and 5–9, feed water at a temperature of approximately 200° F. was pumped at the rate of approximately 20,000 lbs. per hour, from the deaerator 28, and into the heat exchanger 39. In the heat exchanger 39, the feed water was preheated to a temperature of approximately 300° F., and thence directed into the economizer 34. In the economizer 34, the feed water was heated by means of flue gases at a temperature of approximately 1540° F., to a water temperature of approximately 500° F.

The heated feed water was then directed through the heat exchanger 39, and left the latter at a temperature of approximately 350° F. for introduction into the coil 48 of the radiant section 32. The chamber 40 of the radiant section 32 was heated by the burner 58, with a No. 6 fuel oil being burned in the latter. The fuel oil was stored in the fuel oil tank 96, and was pumped by the pump 100 through the preheater 102 prior to entry into the burner 58. In the fuel oil preheater 102, the fuel oil was heated by hot water from the heat exchanger 39, said hot water having been circulated through the piping 104, 105.

The feed water, in passing through the coil 48, was vaporized, so as to produce steam of about 80 percent quality, at a pressure of about 1850 p.s.i.g. The total tube production rate of steam per unit total surface area (including the fins on the tubes 60), was 8 lbs. of steam per square foot.

The steam thus produced was then directed into an oil-bearing formation which yielded oil of relatively high viscosity and low A.P.I. gravity, said oil-bearing formation having been previously depleted to the extent of 12 percent by pumping procedures. The steam flooded the oil-bearing formation, and effected a secondary recovery oil yield amounting to 35 percent.

The thermal recovery apparatus 20 provides unusual features and advantages in structure and operation, as compared to the heaters of the prior art. The use of said apparatus for thermal recovery purposes enables a substantial reduction in the amount of treatment of feed water that is necessary, particularly with respect to the removal of solids from said feed water. Thus, the apparatus 20 may be operated efficiently although using feed water having a relatively high solids content, and which could not be employed in conventional steam generators without necessitating a very high blowdown rate. Feed water for the apparatus 20 may have a concentration of solids as high as 5,000 parts per million. This advantage in operation is provided primarily as a result of the design of the heater 24, including the "once-through" feature thereof, for the production of steam of approximately 75–90 percent quality. Such steam contains a sufficient amount of unvaporized water to maintain any solids present therein in solution.

The apparatus 20 is of relatively simple and inexpensive construction. One of the chief features which lends simplicity to said apparatus is the use of the coil 48, providing for the vaporization of the steam in a single passage through the radiant section 32. Also, no steam separation drums, such as are often required in the steam generators of the prior art, are employed.

The apparatus 20 is also relatively simple and inexpensive to operate. Here again, the absence of a steam separation drum, together with the usually associated controls, results in a greatly simplified operation. Also, said apparatus can function well without the necessity of having an operator constantly in attendance.

The apparatus 20 produces steam in greater quantities, and at higher pressures and higher temperatures than has been the case in the steam generators of the prior art. Thus, the use of said apparatus enables high pressure operation up to the critical pressure of water at a relatively minor increase in cost over low pressure operation. Also, a much greater volume of steam is produced at the outlet 52 of the coil 48, than is the case in conventional types of steam generators. For example, for identical temperature and pressure conditions in the 1,500 p.s.i.g. operating range, a conventional steam generator produces about 25 percent by volume at the outlet. The coil 48, in contrast, under identical conditions produces about 98 percent of steam by volume at the outlet 52 thereof.

The design of the apparatus 20, furthermore, provides an unusually large furnace volume, such as is necessary for mild firing conditions; while, at the same time, assuring ample heat transfer surfaces, such as are essential to the elimination of zones of high heat concentration. The use of the apparatus 20, as a consequence, results in a greatly improved degree of recovery of oil, especially in the case of highly viscous crude oils; and renders steam flooding attractive from the economic standpoint.

In addition, the apparatus 20 requires only a minimum of maintenance care, and offers a maximum period of life expectancy. The placement of the heat exchanger 39 outside of the radiant section 32 serves to avoid the danger of condensation of moisture thereon from the products of combustion within the chamber 40, and possible resultant corrosion. In addition, the tubes 46 of the coil 48, being disposed horizontally, and adjacent the refractory lining 42, provide a "water-wall" type of construction, which serves to shield the refractory lining 42 from excessive radiant heat, and thus appreciably increase the life of said refractory lining 42.

It may be noted that the tubes 46 are free to expand lengthwise, and that there are thus eliminated high stress concentrations, such as might occur in restrained tubes when subjected to great heat. A defective tube 46 may easily be replaced by cutting off said tube from the return bends 47 located at the opposite ends thereof, respectively; removing the defective tube; inserting a new tube 46 in position; and welding said new tube to the existing return bends 47.

The design of the economizer 34 renders the heater 24 suitable for firing with one of the cheaper types of fuel, such as crude oil or pitch. Such cheaper fuels, as previously pointed out, have a greater tendency to deposit soot, than is the case with the better grades of fuels. The positioning of the fins 66, extending longitudinally of the tubes 60, insures a maximum degree of heat transfer to the latter. The longitudinal positioning of the fins also tends to greatly decrease the amount of deposit of soot on the fin surfaces. This results from the fact that the flue gases passing through the horizontal duct portion 37 do not flow in a direction normal to the fin surfaces, but rather in a direction parallel to said fin surfaces. The gases, thus, as previously pointed out, carry most of the soot particles entrapped therein through to the duct outlet 38. The movement of the gases through the duct portion 37 may, in fact, serve to purge the fin surfaces of soot particles already deposited thereon.

Figure 10:
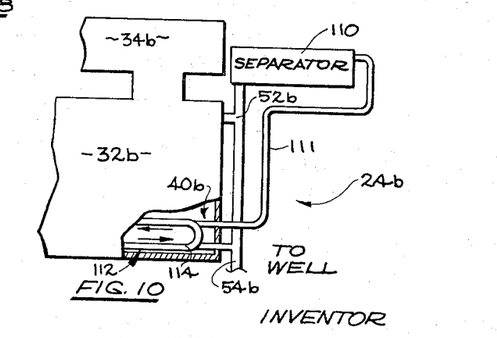
FIG. 10 is a diagrammatic view of a modified thermal recovery heater in accordance with the invention.

Referring to FIG. 10, a modified heater 24b is shown, which is particularly adapted for use in applications in which formations containing oil shale are to be flooded. In the case of the heater 24b, a steam separator 110 is provided for steam emerging from the outlet 52b of the radiant section 32b. The steam from the separator 110 is conducted by piping 111 to a superheater 112 in the nature of an added pipe coil 114 within the chamber 40b of the radiant section 32b. In the pipe coil 114, the steam is further heated (e.g., from an initial temperature of about 550° F. to an ultimate temperature of about 900° F.), as a result of the subjection of said steam to further radiant heating within the chamber 40b. The superheated steam is conducted to the piping 54b leading to an oil-bearing formation, such as of the type seen at 22 in FIG. 1. In view of the high quality of the superheated steam, said steam is adapted to retort in place any oil shale which may be present in said formation, as well as to function for flooding the well in the manner previously described.

Figure 11:
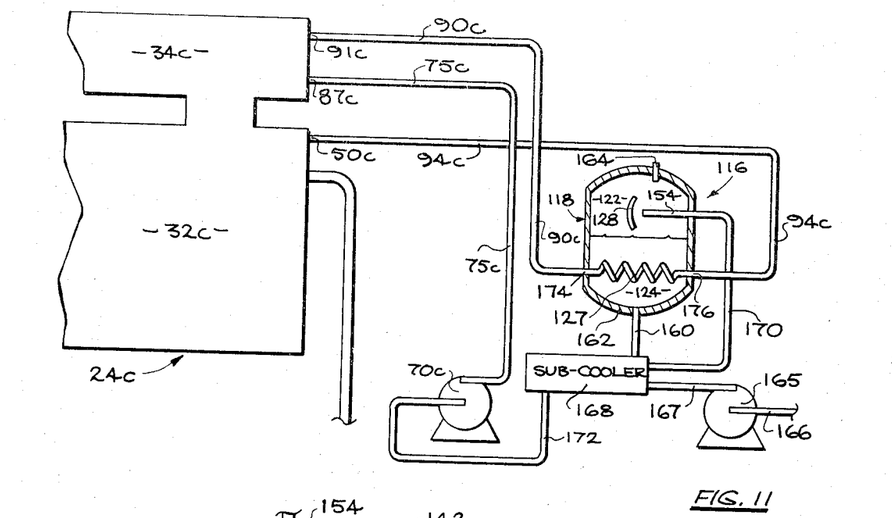
FIG. 11 is a diagrammatic view of modified thermal recovery apparatus of the invention, and including a mechanical deaerator.

Referring to FIG. 11, a modified form of the invention is shown, in which an improved deaerator 116,, being of the mechanical type, is coupled with a heater 24c, the latter being identical in structure to the heater 24, as previously described with reference to FIGS. 1–3 and 5–9. The deaerator 116 (see also FIG. 12), is constructed of a generally hollow receptacle 118, which is divided by a generally horizontally extending wall 120 into an upper compartment 122 and a lower compartment 124. Within said lower compartment 124 is maintained a reservoir of deaerated feed water 126. Disposed within the reservoir 126 is a pipe coil 127.

Figure 12:
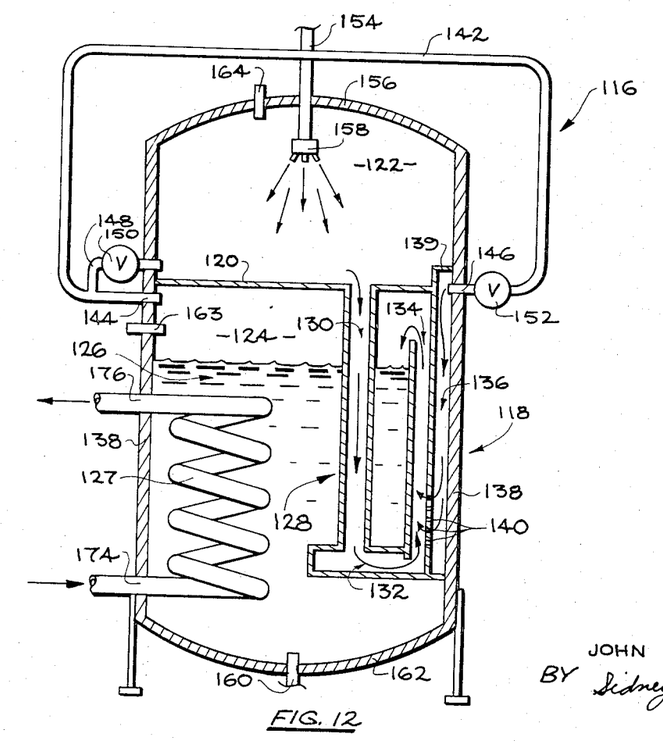
FIG. 12 is an enlarged vertical section taken through the deaerator of FIG. 11.

A set of plates providing a baffling 128 is suspended from the wall 120. The major portion of said baffling 128 lies within the reservoir 126. The baffling 128 provides a first and generally vertically extending passageway 130 which is in communication with the upper compartment 122; a second and generally horizontally-extending passageway 132 in communication with the lower end of the passageway 130; and a third and generally vertically extending passageway 134, which is in communication at its lower end with the passageway 132, and at its upper end opens into the compartment 124. The baffling 128 also provides a fourth and generally vertically extending passageway 136 located adjacent the side wall 138 of the receptacle 118, and being closed at its upper end 139. The baffling 128 is formed with perforations 140, which provide communication between the respective lower ends of the pasasgeways 134 and 136.

A pipe 142, at one end 144 thereof, extends outwardly from the lower compartment 124 through an opening in the side wall 138, said opening being located adjacent the horizontal wall 120. At the opposite end 146 thereof, the pipe 142 enters the passageway 136 through a further opening in the side wall 138, said latter opening being located adjacent the upper end 139 of the passageway 136. A relatively short pipe 148 extends upwardly from the pipe 142 adjacent the end 144 thereof, and enters the upper compartment 122 through a still further opening in the wall 138, said latter opening being located adjacent the horizontal wall 120. Suitable valves 150 and 152 are located in the pipe 148, and in the pipe 142 (adjacent the end 146 thereof), respectively.

A feed water inlet pipe 154 enters the upper compartment 122 through a suitable opening in the top wall 156 of the receptacle 118. Mounted on the pipe 154, and at the terminal end thereof, is a spray nozzle 158 of conventional construction. An outlet pipe 160 projects outwardly from the lower compartment 124, said pipe 160 extending through a suitable opening in the bottom wall 162 of the receptacle 118.

A vent 163 is provided for the lower compartment 124, and is located in the side wall 138 of the receptacle 118, a short distance below the end 144 of the pipe 142. The vent 163 is of conventional structure, and is adapted to vent air from the compartment 124 to the atmosphere. Another vent 164, also of conventional structure, is located in the top wall 156 of the receptacle 118. The vent 164 serves to vent air from the compartment 122 to the atmosphere.

An inlet pump 165 of conventional type is provided for the deaerator 116. At its inlet side, said pump 165 is adapted to receive incoming feed water, supplied by a pipe 166. At its outlet side, the pump 165 is connected by a pipe 167 to a sub-cooler, or heat exchanger, 168. The sub-cooler 168 is adapted to exchange heat between comparatively cold incoming feed water received through the pipe 167, and deaerated feed water (which is comparatively warm), received from the compartment 124. Said sub-cooler 168 is connected by piping 170 to the inlet pipe 154 of the upper compartment 122 of the receptacle 118 for direction of the incoming feed water into the latter.

The outlet pipe 160 is connected at its outer end to the sub-cooler 168, and is adapted to conduct deaerated water from the lower compartment 124, and into said sub-cooler 168. An outlet pipe 172 for the sub-cooler 168 serves to connect the latter to a feed pump 70c. Said feed pump 70c is connected by piping 75c to the inlet 87c of the pipe coil (not shown) of the economizer 34c of a heater 24c in accordance with the invention.

The pipe coil 127, at the inlet end 174 thereof, is connected by piping 90c to the outlet 91c of the economizer 34c. At its opposite, or outlet, end 176, the pipe coil 127 is connected by piping 94c to the inlet 50c of the tube coil (not shown) of the radiant section 32c.

In the operation of the deaerator 116, feed water from the supply pipe 166 is pumped, by means of the pump 165 and piping 167, into the sub-cooler 18. In the latter, the feed water is preheated by exchange of heat with deaerated feed water received in the sub-cooler 168 from the compartment 124 through the pipe 160. The incoming feed water is thereafter conducted from the sub-cooler 168 through the piping 170 and into the feed water inlet pipe 154 of the upper compartment 122. The feed water is then sprayed into the compartment 122 by the spray nozzle 158. The feed water passes from the compartment 122 through the passageways 130, 132 and 134 of the baffling 128, and into the reservoir 126.

The heating coil 127 serves to conduct hot water from the economizer 34c, and received through the pipe 91c, through the reservoir 126; said hot water thereafter being conducted through the pipe 94c to the inlet 50c of the tube coil of the radiant section 32c. The hot water, in passing through the coil 127, heats the feed water in the reservoir 126, and thus generates low pressure steam (e.g., at about 10–15 p.s.i.g.).

The steam which has been generated in the reservoir 126 passes outwardly from the compartment 124 through the end 144 of the pipe 142. A small portion of this steam is conducted by the pipe 148 (controlled by the valve 150) into the upper compartment 122. The steam here comes into contact with the spray of incoming feed water from the nozzle 158, and serves to preheat and partially deaerate said feed water. The air which is here removed from the feed water is vented to the atmosphere through the vent 164.

The largest portion of the steam which leaves the compartment 122 passes through the pipe 142 to the end 146 thereof, and into the passageway 136 of the baffling 128. The steam then flows through said passageway 136, through the perforations 140, and into the pasasgeway 134 of the baffling 128. The steam here comes into contact with the preheated feed water, and an intimate, boiling mixture of steam and water is produced. As a result, a scrubbing effect is achieved, which serves to substantially completely remove oxygen and other components of air from the water. The steam, at the same time, serves to force the feed water upwardly through the passageway 134, and into the reservoir 126.

The air which has been removed from the feed water collects within the lower compartment 124 and above the reservoir 126. This air is vented to the atmosphere through the vent 163.

The feed water in the reservoir 126, having thus been both deaerated and preheated, is discharged from the lower compartment 124 through the outlet pipe 160, and into the sub-cooler 168. In said sub-cooler 168, the feed water is cooled about 10–20° F. by exchange of heat with incoming feed water from the pipe 167, in order to reduce the required net positive suction head on the feed pump 70c. Upon leaving the sub-cooler 168 through the pipe 172, the feed water is pumped by the pump 70c through the piping 75c, and into the pipe coil of the economizer 34c.

Example

As an example of the operation of the deaerator 116, feed water from the inlet pump 164 was pumped at a temperature of about 50° F. into the sub-cooler 168. The feed water in the sub-cooler 168 was heated to a temperature of about 80° F., and at this temperature was conducted through the pipes 170 and 154 to the nozzle 158, which sprayed said feed water into the compartment 122. In the compartment 122, the feed water was heated and partially deaerated by steam received into said compartment through the pipe 148. The air here removed from the feed water was vented to the atmosphere through the vent 164. The feed water then passed through the passageways 130, 132 and 134 of the baffling 128, and into the reservoir 126. In the passageway 134, the feed water was contacted by steam received from the passageway 136 through the perforations 140, and the deaeration of said feed water was thus completed. The air here removed from the feed water was vented to the atmosphere through the vent 163.

Hot water received through the pipe 91c from the economizer 34c, entered the pipe coil 127 within the reservoir 126 at a temperature of about 545° F. After passing through the pipe coil 127, the hot water was discharged from the latter at a temperature of about 385° F. The feed water in the reservoir 126 was at the same time heated to a temperature of about 240° F., with steam being generated at a pressure of about 10–15 p.s.i.g. However, upon leaving the compartment 124 through the pipe 160, and passing through the sub-cooler 168, the thus preheated and deaerated feed water was cooled to a temperature of about 210° F. The feed water was then pumped by the pump 70c through the pipe 75c, and into the inlet 87c of the economizer 34c. The hot water which had left the pipe coil 27 at a temperature of about 385° F., was conducted by the pipe 94c to the inlet 50c of the tube coil of the radiant section 32c. In the latter, steam was produced at a pressure of about 1500 p.s.i.g. and a temperature of about 600° F.

As compared to the mechanical deaerators of the prior art, the deaerator 116 of the invention provides for the generation of the necessary steam within the deaerator itself. There is thus eliminated the requirement of a separator at the outlet 52c of the heater 24c, to provide steam for said deaerator 116. Furthermore, the use of the deaerator 116 eliminates the need for a high pressure reducing station, such as would otherwise be required to reduce the high pressure steam from the outlet 52c of the heater 24c, to the desired low pressure (e.g., about 10–15 p.s.i.g.) desired for use in the deaerator 116. The use of the deaerator 116 also greatly simplifies the piping arrangement necessary to accomplish the necessary deaeration of the feed water.

Figure 13:
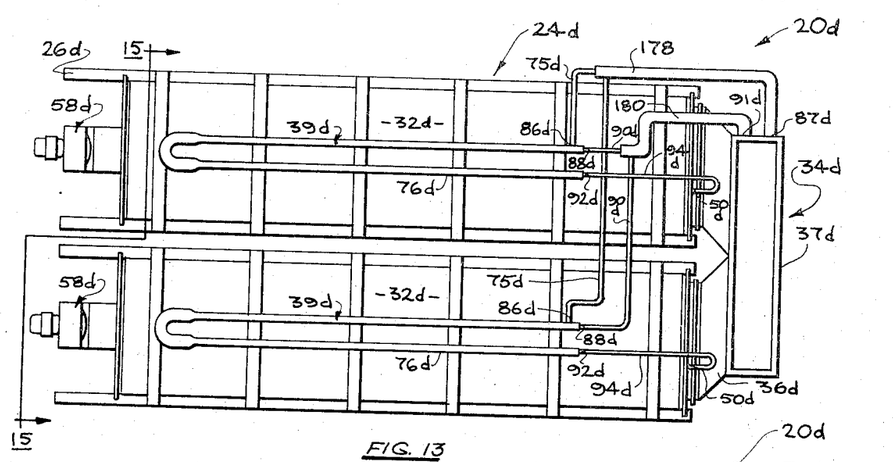
FIG. 13 is a top plan of thermal recovery apparatus of the invention, and providing two heaters coupled together.
Figure 14:
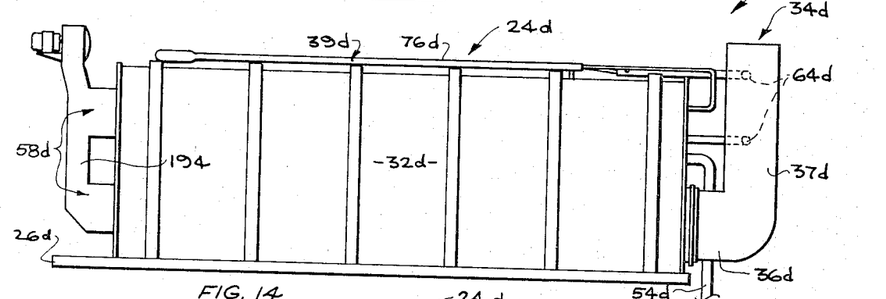
FIG. 14 is a side elevation of the apparatus of FIG. 13.

Referring to FIG. 13, thermal recovery apparatus 20d of the invention is shown, which apparatus provides two heaters 24d, mounted in parallel relationship to each other. Each of the heaters 24d is similar in structure to the heater 24 of FIGS. 1–3 and 5–9, and is mounted on a suitable skid 26d. (See also FIG. 14.) Each heater 24d thus includes a radiant section 32d. From each radiant section 32d extends a substantially horizontal duct portion 36d for effluent gases. However, a common vertical duct portion 37d is provided for the two heaters 24d. Mounted within said vertical duct portion 37d is an economizer pipe coil 64d. Associated with each of the heaters 24d, is a heat exchanger 39d, corresponding in structure to the heat exchanger 39 of FIGS. 1–3 and 5–9, and serving as a preheater for feed water entering the economizer 34d.

Feed water to be introduced into the coil 64d of the economizer 34d is preheated by means of the two heat exchangers 39d, associated respectively with the two heaters 24d. The outer pipe 76d of each heat exchanger 39d is adapted to receive deaerated feed water, pumped thereinto by a pump (not shown). The outlet 86d of each of the pipes 76d is connected by a pipe 75d to a pipe 178, the latter being connected to the inlet 87d of the pipe coil 64d of the economizer 34d. Hot water is conducted from the outlet 91d of the economizer 34d through a pipe 180. To the latter are connected two pipes 90d, leading to the inlets 88d of the inner pipes (not shown) of the two heat exchangers 39d, respectively. A pipe 94d is provided, to conduct hot water from the outlet 92d of each of the heat exchangers 39d, and to inlet 50d of the tube coil 48d (see also FIG. 15) within the respective chamber 40d.

Figures 15, 16:
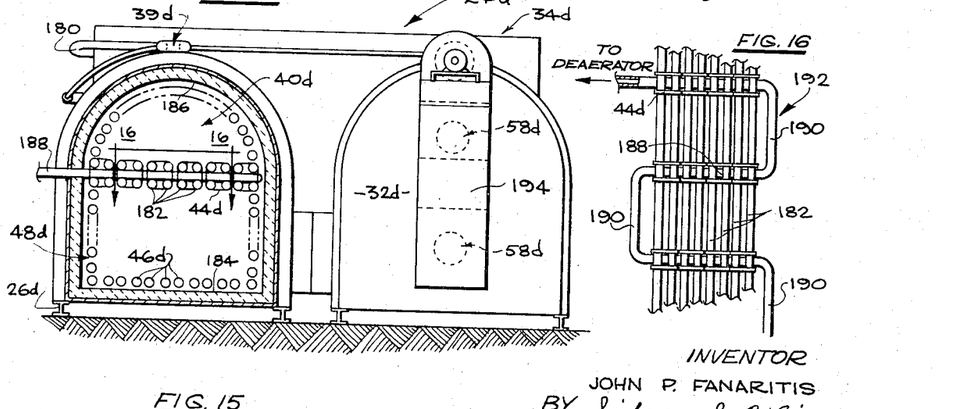
FIG. 15 is an end elevation, being partly in section, as viewed along the lines 15—15 of FIG. 13.
FIG. 16 is a fragmentary section taken along the lines 16—16 of FIG. 15.

The tube coil 48d located within each of the respective chambers 40d of the two heaters 24d includes tubes 46d, the latter generally corresponding in structure and placement to the tubes 46 of the embodiment of FIGS. 1–3 and 5–9. However, each of the coils 48d also includes a series of horizontally positioned tubes 182 which are located approximately midway between the floor 184 and the roof 186 of the respective chamber 40d, and which extend longitudinally of said respective chamber 40d. The tubes 182 of each coil 48d are supported by means of suitable support members 44d, the latter, in turn, each being secured to one of a series of transversally extending supported tubes 188. The tubes 188 are placed at convenient locations within the respective chamber 40d, and are preferably of a centrifugally cast alloy construction (e.g., 25 percent chrome and 20 percent nickel). The supporting tubes 188 might, for example, be located at six-foot centers spaced along the longitudinal axis of the respective chamber 40d. Thus, for a chamber 40d which is forty-eight feet in length, eight supporting tubes 188 might be provided. The total number of tubes 46d in each chamber 40d might be as high as about one hundred and twenty.

The supporting tubes 188 within each chamber 40d are connected together at their respective opposite ends by pipes 190, and so as to form a continuous tube coil 192 (see also FIG. 16). The tubes 188 are cooled by conducting through said coil 192 feed water, prior to the entrance of the latter into the deaerator (not shown) associated with each of the heaters 24d. The feed water is thus, at the same time, preheated.

Each of the chambers 40d is provided, at one end thereof, with two burners 58d. One of said burners 58d for each chamber 40d, is located above the respective center tube coil 192; while the other burner 58d is located below the respective tube coil 192. The two burners 58 for each chamber 40d are preferably designed to burn gas as a fuel, said gas being supplied by a common fuel distributor 194.

The economizer 34d, being provided in a vertical duct portion 37d, is of generally the same structure as has been described in the case of the economizer 34a of the heater 24a of FIG. 4. However, if desired, the economizer 34d can be constructed in the manner of the economizer 34 of FIGS. 1–3 and 5–9.

Each of the heaters 24d, when in operation, functions in a manner similar to that already described in the case of the heater 24 of FIGS. 1–3 and 5–9. However, as has been previously described, all of the effluent gases from the two heaters 24d are directed outwardly through a common vertical duct portion 37d, in which is mounted a single economizer 34d. Said economizer 34d receives from the pipe 178 deaerated feed water which has been preheated by passage through the supporting tubes 188, as well as passage through the two heat exchangers 39d. The economizer 34d discharges, through the pipe 180, hot water for preheating the incoming feed water in the heat exchangers 39d, and for feeding into the two chambers 40d of the radiant sections 32d. All of the steam produced by the two heaters 24d is directed outwardly through a single steam outlet pipe 54d, and into the well to be flooded.

The thermal recovery apparatus 20d just described offers unusual advantages in respect of its operation. The novel configuration of the tube coil 48d provides a maximum installed tube surface for a given shell size. In addition, one of the center tubes 182 of each of the coils 48d may be employed as the outlet tube for the respective coil 48d, and will thus be fired on both sides thereof to provide a more uniform radiant heat distribution in the area of highest tube wall temperatures. The apparatus 20, furthermore, can produce as much as approximately 100,000 lbs. of steam per hour. The apparatus 20 although providing such a high rate of steam production, at the same time can be constructed as a portable unit suitable for stationary or barge mounting.

Although the invention has been described with reference to particular embodiments thereof, it will be realized that various changes may be made therein without departing from the spirit of the invention, or the scope of the appended claim.

I claim:

A water heater adapted for use in the thermal recovery of oil from wells, said heater comprising:

(a) a chamber;
(b) means for conducting hot gases from said chamber;
(c) means for producing radiant heat within said chamber and for the conversion into steam of water in passage through said chamber;
(d) means for the conduction of product steam from said chamber;
(e) means for conducting water in a single pass through said chamber including an economizer for exchanging heat between said hot gases and feed water to be directed into said chamber;
(f) a heat exchanger, directly connected to said single pass water conducting means (e), located externally of said chamber for exchanging heat between feed water to be directed into said economizer and feed water leaving said economizer, and thereby preheating said feed water to be directed into said economizer; and
(g) means directly supplying hot feed water from said economizer (e) to said external heat exchanger (f).

References Cited

UNITED STATES PATENTS

| | | | |
|---|---|---|---|
| 1,942,861 | 1/1934 | Huster | 122—1 |
| 2,170,349 | 8/1939 | Bailey. | |
| 2,738,852 | 3/1956 | Freneau et al. | 55—198 |
| 2,872,999 | 2/1959 | Spining | 55—198 |
| 2,918,909 | 12/1959 | Nickel | 122—1 |
| 2,966,896 | 1/1961 | Vogler | 122—1 |
| 2,989,039 | 6/1961 | Frendberg et al. | 122—478 |
| 3,035,556 | 5/1962 | Brunner | 122—476 |
| 3,106,192 | 10/1963 | Hingst | 122—7 |
| 3,135,250 | 6/1964 | Argersinger | 122—406 |

OTHER REFERENCES

"Water Treatment," part one, pages 94 and 95, Power, New York, December 1958.

KENNETH W. SPRAGUE, *Primary Examiner.*